United States Patent
Wilson et al.

(10) Patent No.: US 9,890,440 B2
(45) Date of Patent: Feb. 13, 2018

(54) LEAF SPRING AND METHOD OF MANUFACTURE THEREOF HAVING SECTIONS WITH DIFFERENT LEVELS OF THROUGH HARDNESS

(71) Applicant: Hendrickson USA, LLC, Itasca, IL (US)

(72) Inventors: William Wilson, Sonoma, CA (US); Brian Farrell, Stratford (CA)

(73) Assignee: Hendrickson USA, L.L.C., Itasca, IL (US)

( * ) Notice: Subject to any disclaimer, the term of this patent is extended or adjusted under 35 U.S.C. 154(b) by 0 days.

(21) Appl. No.: 15/431,480

(22) Filed: Feb. 13, 2017

(65) Prior Publication Data

US 2017/0204488 A1    Jul. 20, 2017

Related U.S. Application Data

(62) Division of application No. 14/499,609, filed on Sep. 29, 2014, now Pat. No. 9,573,432.

(60) Provisional application No. 61/885,375, filed on Oct. 1, 2013.

(51) Int. Cl.

| B60G 11/02 | (2006.01) |
|---|---|
| C21D 9/02 | (2006.01) |
| C21D 1/60 | (2006.01) |
| C21D 1/42 | (2006.01) |
| C21D 1/25 | (2006.01) |
| F16F 1/18 | (2006.01) |

(52) U.S. Cl.
CPC ............... *C21D 9/02* (2013.01); *B60G 11/02* (2013.01); *C21D 1/25* (2013.01); *C21D 1/42* (2013.01); *C21D 1/60* (2013.01); *B60G 2206/428* (2013.01); *B60G 2206/84* (2013.01); *B60G 2206/8402* (2013.01); *C21D 2211/008* (2013.01); *C21D 2221/00* (2013.01); *F16F 1/18* (2013.01)

(58) Field of Classification Search
CPC .. B60G 11/02; C21C 1/25; C21C 1/42; C21C 1/60; C21D 9/02; F16F 1/18
See application file for complete search history.

(56) References Cited

U.S. PATENT DOCUMENTS

| 779,021 A | 1/1905 | Baldwin |
|---|---|---|
| 1,014,406 A | 1/1912 | Mcintyre |
| 1,324,440 A | 12/1919 | Ackerman |

(Continued)

FOREIGN PATENT DOCUMENTS

| CA | 845540 | 6/1970 |
|---|---|---|
| CN | 101429591 | 5/2009 |

(Continued)

OTHER PUBLICATIONS

Zheng, W., et al., Materials Technology Laboratory, Report MTL 2001-20(CF), MTL/CANMET, Apr. 2001, pp. 1-15.

(Continued)

*Primary Examiner* — Vishal R Sahni
(74) *Attorney, Agent, or Firm* — Cook Alex Ltd.

(57) ABSTRACT

Leaf springs, and methods of manufacturing thereof, having first and second sections, spaced apart along the length of said leaf spring, said sections are through hardened and tempered to achieve, respectively different levels of finished through hardness, are disclosed.

12 Claims, 2 Drawing Sheets

(56) References Cited

U.S. PATENT DOCUMENTS

| | | | |
|---|---|---|---|
| 1,546,896 A | 7/1925 | William | |
| 1,730,918 A | 10/1929 | Carey | |
| 1,794,445 A | 3/1931 | Carey | |
| 1,828,325 A | 10/1931 | Heinrich | |
| 2,041,159 A | 5/1936 | Wallace | |
| 2,170,859 A | 8/1939 | Frickey | |
| 2,294,161 A | 8/1942 | Crowe | |
| 2,608,752 A | 9/1952 | Robert | |
| 2,615,710 A | 10/1952 | Lyman | |
| 2,831,788 A | 4/1958 | Bridge | |
| 2,882,191 A | 4/1959 | Swaal | |
| 2,935,433 A | 5/1960 | Robert | |
| 3,153,844 A | 10/1964 | Theodor | |
| 3,173,668 A | 3/1965 | Giovinazzo | |
| 3,233,915 A | 2/1966 | Hamlet | |
| 3,240,639 A | 3/1966 | Franz | |
| 3,281,139 A | 10/1966 | Faherty | |
| 3,339,908 A | 9/1967 | Komarnitsky | |
| 3,345,727 A | 10/1967 | Komarnitsky | |
| 3,355,333 A | 11/1967 | Haynes | |
| 3,419,260 A | 12/1968 | Hrusovsky | |
| 3,466,202 A * | 9/1969 | Hrusovsky | B21D 53/886 148/567 |
| 3,585,086 A | 6/1971 | Hrusovsky | |
| 3,661,655 A | 5/1972 | Hrusovsky | |
| 3,753,798 A | 8/1973 | Komatsu | |
| 3,820,373 A | 6/1974 | Shiguma | |
| 4,010,969 A | 3/1977 | Cantrell | |
| 4,021,274 A | 5/1977 | Chadwick | |
| 4,123,301 A | 10/1978 | Pope | |
| 4,153,454 A | 5/1979 | Emi | |
| 4,193,824 A * | 3/1980 | Egorov | B21D 53/886 148/575 |
| 4,219,371 A | 8/1980 | Imagumbai | |
| 4,486,248 A | 12/1984 | Ackert | |
| 4,521,258 A | 6/1985 | Tamehiro | |
| 4,544,406 A | 10/1985 | Yamamoto | |
| 4,575,397 A | 3/1986 | Heller | |
| 4,623,133 A * | 11/1986 | Davis | F16F 1/22 267/53 |
| 4,659,398 A | 4/1987 | Heller | |
| 4,842,655 A | 6/1989 | Porowski | |
| 4,845,328 A | 7/1989 | Storm | |
| 5,004,213 A | 4/1991 | Schulte | |
| 5,100,482 A | 3/1992 | Tanaka | |
| 5,108,518 A | 4/1992 | Fukui | |
| 5,161,785 A | 11/1992 | Ingvarsson | |
| 5,234,067 A * | 8/1993 | Simard | B60G 5/01 180/24.01 |
| 5,244,189 A | 9/1993 | Pierman | |
| 5,248,130 A | 9/1993 | Lisowsky | |
| 5,451,749 A | 9/1995 | Griebel | |
| 5,611,234 A | 3/1997 | Allegrucci | |
| 5,706,559 A | 1/1998 | Oliver | |
| 5,724,851 A | 3/1998 | Rivard | |
| 5,776,267 A | 7/1998 | Nanba | |
| 5,906,691 A | 5/1999 | Burnett | |
| 5,914,055 A | 6/1999 | Roberts | |
| 6,012,744 A | 1/2000 | Wilson | |
| 6,129,999 A | 10/2000 | Ueda | |
| 6,273,974 B1 | 8/2001 | Lat | |
| 7,284,308 B2 | 10/2007 | Akeda | |
| 7,662,244 B2 | 2/2010 | Yoshizawa | |
| 7,744,707 B2 | 6/2010 | Brunson | |
| 7,887,924 B2 | 2/2011 | Urushihara | |
| 8,002,910 B2 | 8/2011 | Tivelli | |
| 8,074,355 B1 | 12/2011 | Cleary | |
| 8,328,169 B2 | 12/2012 | Kuno | |
| 8,557,061 B2 | 10/2013 | Yoshihara | |
| 8,741,216 B2 | 6/2014 | Sugimoto | |
| 8,926,768 B2 | 1/2015 | Suzuki | |
| 2004/0047758 A1 | 3/2004 | Olson | |
| 2005/0236794 A1 | 10/2005 | Cai | |
| 2006/0021682 A1 | 2/2006 | Saha | |
| 2007/0068605 A1 | 3/2007 | Statnikov | |
| 2009/0133785 A1* | 5/2009 | Ayada | C21D 1/10 148/567 |
| 2009/0139615 A1 | 6/2009 | Ayada | |
| 2009/0301613 A1 | 12/2009 | Koo | |
| 2011/0126944 A1 | 6/2011 | Kami | |
| 2012/0018056 A1 | 1/2012 | Nakagawa | |
| 2012/0256361 A1* | 10/2012 | Sugimoto | C21D 1/25 267/158 |
| 2014/0144552 A1 | 5/2014 | Kami | |
| 2015/0091225 A1* | 4/2015 | Wilson | C21D 1/25 267/47 |

FOREIGN PATENT DOCUMENTS

| | | |
|---|---|---|
| CN | 102605242 | 7/2012 |
| DE | 1533252 | 4/1973 |
| EP | 2283946 | 2/2011 |
| GB | 117163 | 7/1918 |
| GB | 894896 | 4/1962 |
| GB | 1188509 | 4/1970 |
| JP | 54102223 | 8/1979 |
| JP | H05320826 | 12/1993 |
| JP | 06033189 | 2/1994 |
| JP | 09324219 | 12/1997 |
| JP | 10196697 | 7/1998 |
| JP | 2002146472 | 5/2002 |
| JP | 2009296678 | 12/2009 |
| WO | WO 2008/45631 | 4/2008 |
| WO | WO 2008/55459 | 5/2008 |

OTHER PUBLICATIONS

Baragar, D.L., et al., Materials Technology Laboratory, Report MTL 2001-2 (CF), MTL/CANMET, Feb. 2001, pp. 1-5, Figs 6, 7, 8 & 9.

ASTM International, Standard Test Method for Brinell Hardness of Metallic Materials, Designation E 10-01, Jun. 2004, pp. 1-9.

ASTM International, Standard Test Method for Rockwell Hardness and Rockwell Superficial Hardness of Metallic Materials, Designation E 18-05, Apr. 2005, pp. 1-22.

ASTM International, Standard Test Method for Microindentation Hardness of Materials, Designation E 384-05, Aug. 2005, pp. 1-33.

Gangloff, Richard P., Hydrogen Assisted of High-Strength Alloys, School of Engineering & Applied Science, University of VA., Ch. 6, Apr. 2003, pp. 1-194.

Prabhudev, K.H., Handbook of Heat Treatment of Steels; Elements of the Process of Heat Treating, Ch. 2, 1988, cover page, table of contents, 42-133.

ASM Metals Handbook, vol. 4, Heat Treatment, Section on Tempering of Steel,1991, 34 pages.

ASM Metals Handbook, vol. 4, Heat Treatment, Section on Principles of Heat Treating of Steels,1991, 36 pages.

SAE International, Methods of Measuring Decarburization, 1983 Society of Automotive Engineers, Inc., pp. 1-7, and SAE J419 Revised Dec. 1983 (2 pages).

Kaiser, Bruno, Dr.-Ing, The Effect of Shot Peening on the Fatigue Strength of Spring Elements, Institute for Materials Technology, Oct. 1987 Springs, pp. 59-65.

\* cited by examiner

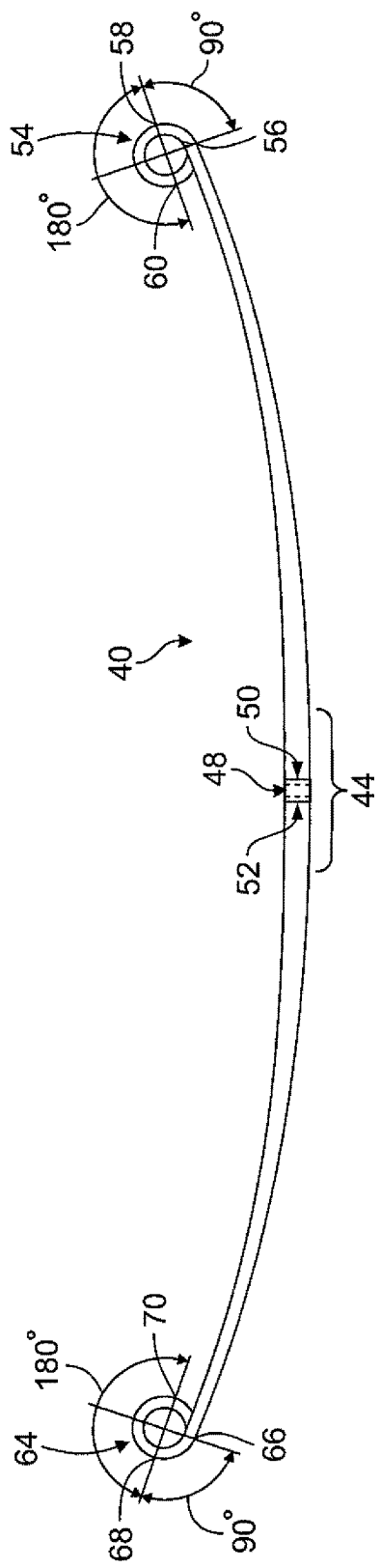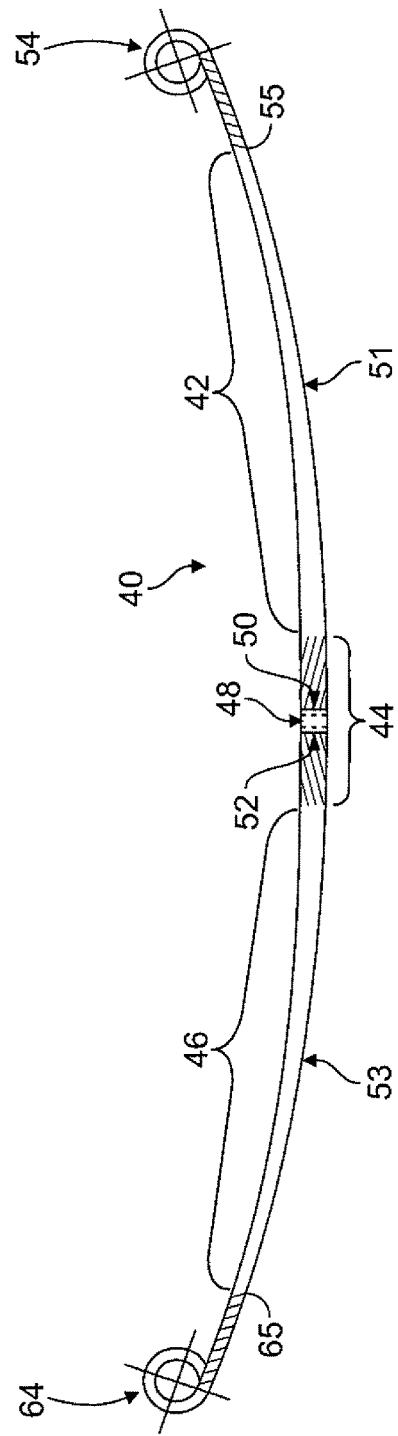

|  | Temperature (F) | Hardness (BHN) |
|---|---|---|
| Primary or Conventional Tempering (1hr) | 1000 | 360 |
|  | 900 | 420 |
|  | 810 | 490 |
| Secondary Tempering (45 to 60 seconds) | 1200 | 388 |
|  | 1100 | 406 |
|  | 1000 | 434 |

LEAF SPRING AND METHOD OF MANUFACTURE THEREOF HAVING SECTIONS WITH DIFFERENT LEVELS OF THROUGH HARDNESS

CROSS-REFERENCE TO RELATED APPLICATIONS

This patent application is a divisional of copending U.S. application Ser. No. 14/499,609, filed Sep. 29, 2014, which claims priority to and the benefit of U.S. Provisional Patent Application Ser. No. 61/885,375, filed Oct. 1, 2013, all of which are incorporated herein by reference in its entirety.

BACKGROUND OF THE INVENTION

Field of the Disclosure

The present disclosure relates generally to leaf springs for vehicle suspensions and to a method of manufacturing the same. The disclosure presents several example embodiments that may be utilized for particular purposes.

Description of Related Art

In the past, quenched and tempered steel leaf springs for trucks and other heavy duty vehicles have been specified with a finished hardness, such as, between 375 BHN and 461 BHN (Brinell hardness number). More recently, leaf springs in Europe and Japan have been manufactured with a higher specified hardness, such as, 461 BHN to 514 BHN. These higher hardness leaf springs show an improvement in fatigue life.

The demand for higher hardness leaf springs is reinforced at least in part by the desire to reduce vehicle weight and in particular, unsprung suspension system weight. The higher hardness leaf springs allow for the use of fewer and/or thinner and lighter leaf springs relative to more traditional, lower hardness leaf springs referred to above. As a result, fuel economy as well as control, performance and efficiency of the suspension system improve. In addition, new laws require trucks and other heavy duty vehicles to be capable of stopping in shorter distances, imposing greater demands on a suspension system.

While higher hardness leaf springs show an improvement in fatigue life, there has been, however, a persistent, low, but nevertheless increased incidence in early failures, particularly of the main leaf of a suspension system at the eyes when compared with springs that are quenched and tempered to traditional hardness ranges. Similar failures have also occurred at or around the center or other bolt hole, if present, in the seat of the leaf spring. These failures are the result of hydrogen environment assisted cracking (HEAC), also known as hydrogen assisted cracking.

Hydrogen assisted cracking can occur in high strength steels when three conditions are met: 1) a condition of static assembly stress such as may occur as the result of clamping forces at a seat or hoop stress from insertion of a bushing into an eye; 2) the existence of a galvanic couple sufficient to charge the steel with hydrogen; and 3) the steel involved is of sufficient strength to trigger the mechanism of failure.

Hydrogen assisted cracking has a peculiarity in that as the strength of the steel increases, the threshold stress required to trigger hydrogen assisted cracking goes down, thus creating a disadvantageous, inverse relationship.

In light of the foregoing, the current state of leaf springs and in particular high hardness leaf springs, given the strong correlation in steels between hardness and strength, leaves something to be desired.

SUMMARY OF THE INVENTION

This disclosure is directed to leaf springs and methods of manufacturing thereof. Through the use of secondary tempering methods as disclosed herein, leaf springs can be manufactured with a specified or high through hardness in the arms or the parabolic or other sections of the leaf spring to provide high strength and hardness, while having lower through hardness in sections of the leaf spring that experience static assembly stress, such as in the eyes and/or seat, thereby reducing the incidence of hydrogen cracking and improving leaf spring fatigue life.

In one aspect, a leaf spring has at least a first section and a second section, spaced apart along the length of the leaf spring. Each of the first and second sections extend across an entire cross section and along the length of the leaf spring. The first section is through hardened and tempered to a finished through hardness. The second section is through hardened and selectively tempered to a finished through hardness that is less than the finished through hardness of the first section of the leaf spring.

In another aspect, a method is disclosed of selectively tempering to a finished through hardness one or more sections of a leaf spring after primary tempering has commenced. Localized heat is applied to a section of the leaf spring, bringing the heated areas within the section to a temperature that is above the temperature at which the leaf spring undergoes primary tempering and below austenitic transformation temperature. The localized heat is maintained for at least twenty (20) seconds. The leaf spring is then rapidly cooled from a temperature that is at least 50° F. and preferably at least 75° F. to 100° F. above the temperature at which tempered martensite embrittlement can occur down to a temperature that is less than about 150° F., by quenching the leaf spring with an aqueous solution to reduce and preferably minimize heat migration into any section to which the localized heat was not applied. The result of this process is a leaf spring having a finished through hardness in the selectively tempered section that is lower than the finished through hardness in at least one other section or in the remainder of the spring.

BRIEF DESCRIPTION OF THE DRAWINGS

In describing the preferred examples, reference is made to the accompanying drawing figures wherein like parts have like reference numerals.

FIG. 1 is a side elevational view of a parabolic leaf spring having first and second opposing eyes at opposite ends and a centrally located seat and showing areas to which localized heat may be applied within these sections of the leaf spring when the spring undergoes secondary tempering as disclosed herein;

FIG. 2 is a side elevational view of the leaf spring shown in FIG. 1 and showing the areas relating to heat migration when heat is applied to areas within sections of the leaf spring, as shown in FIG. 1, during secondary tempering as disclosed herein.

DETAILED DESCRIPTION

Figures 3, 4:
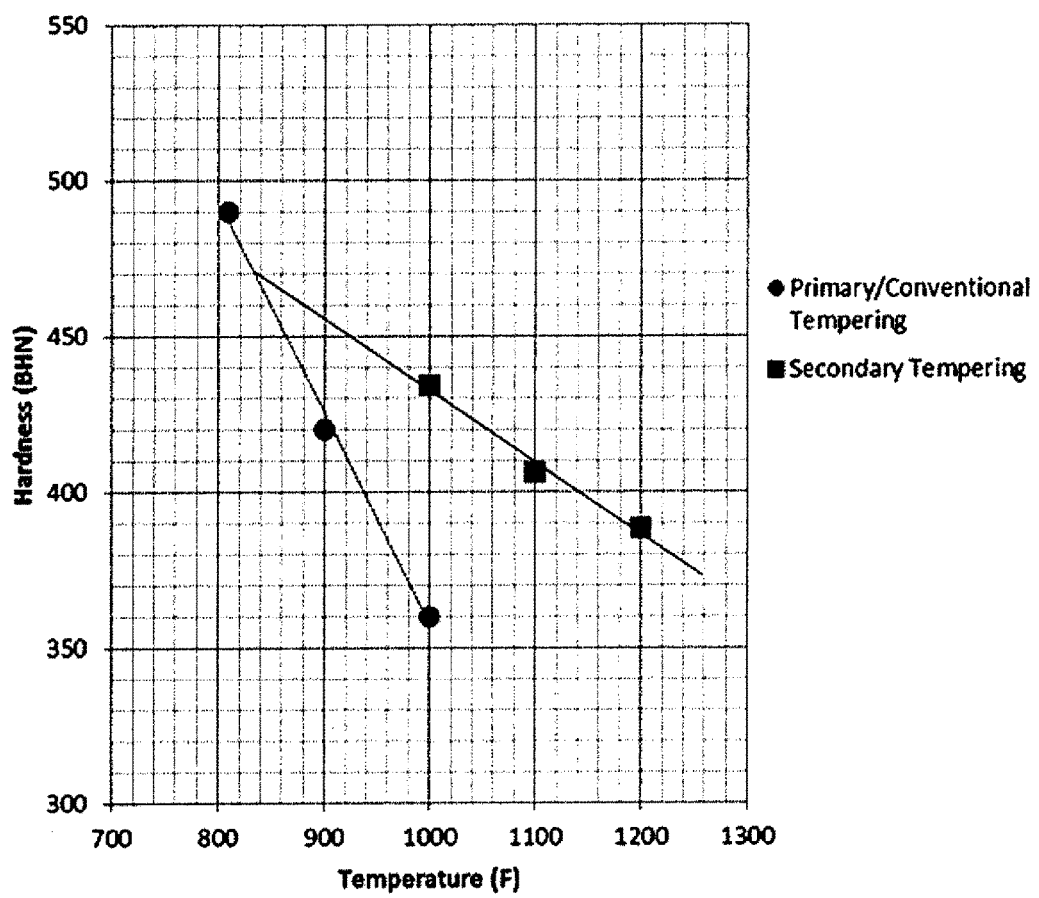
FIG. 3 is a chart of primary and secondary tempering data for example embodiments.
FIG. 4 is a plot of the primary and secondary tempering data provided in FIG. 3.

This disclosure presents examples of leaf springs which have undergone secondary tempering, also referred to herein as selective tempering or retempering, and methods of manufacturing the same. The term "finished through hardness" shall mean the through hardness of a section of a leaf spring that is through hardened and then tempered and/or selectively tempered and subsequently quenched and will exclude the hardness values of any decarburized layer, which if present may extend, for example, to a depth of 0.1 mm to 0.25 mm below the surface of the leaf spring. The finished through hardness of a through hardened, secondarily tempered section or sections of a leaf spring prepared in accordance with this disclosure can be verified by obtaining Vickers micro-hardness hardness values in the section of interest at multiple depths (for example, in increments of 0.05 mm to a depth of 0.5 mm, and thereafter at depths of 0.75 mm, 1 mm, 2 mm, and 4 mm), excluding any measurements associated with any decarburized layer, if present.

As in the case of the first embodiment shown in FIGS. 1 and 2, a leaf spring 40 may be manufactured for example to include a seat 44, optionally having a center hole 48, with arms 42, 46 which in this embodiment comprise parabolic sections 53, 51, extending from the seat 44 in opposite directions, and with respective eye forms 54, 64 at the distal ends of the arms 42, 46.

The leaf spring 40 will have undergone initial processing that is known to those skilled in the art of leaf spring manufacture. Such initial processing includes cutting a blank of suitable size from a bar of carbon steel alloy, such as for example, SAE 5160, 6150, 8660 or 9260; DIN 51CrV4 or 52CrMoV4; JIS SUP 9, 10 or 11; or Hendrickson type 4169 (a derivative of SAE 41 series alloys) referred to in CANMET (Canada Centre for Mineral and Energy Technology) Publication entitled "SEM and microprobe analysis of alloy 4169 for Hendrickson." For parabolic leaf springs, the cut blank may be heated to about 1750° F. or 1800° F. degrees before the tapered profile is imparted to the blank. If an eye form is present, such as eye forms 54 or 64, the eye form or eye forms are rolled at about 1750° F. to 1800° F. The leaf spring 40 is then austenitized at approximately 1550° F. to 1675° F. and quenched in oil, polymer glycol or another suitable quenching solution to form at least 90% martensite throughout the spring. Thereafter, the entire leaf spring 40 undergoes primary tempering during which the leaf spring is heated at a temperature, such as for example 800° F. or more, that is maintained for an extended period of time, typically 60 minutes, to achieve a desired through hardness for the particular alloy steel being used.

As introduced by this disclosure, the process of secondary tempering will begin after primary tempering has commenced. In one example, the leaf spring may exit the primary tempering furnace without having been quenched before secondary tempering begins. Alternatively, the leaf spring may exit the primary tempering furnace and be quenched, reducing the temperature of the leaf spring to ambient temperature, before secondary tempering begins. In either example, secondary tempering begins by applying heat to select locations of the leaf spring 40, such as by heating to 1000° F. to 1200° F., as will be described in greater detail herein. Preferably, for secondary tempering, heat may be supplied by any suitable heat source, including for example, electric induction heating, flame impingement, very high velocity hot air flow, or fluidized bed reactor. If only the eyes are to be treated, a brief immersion of the eyes in a bath of molten salt may be used.

If eye forms 54, 64 undergo secondary tempering, such as for example in FIGS. 1 and 2, the heated area, i.e. the area to which heat is applied, should be limited to the complete eye forms 54, 64. In other words, the heated area should not extend into the tapered section leading into the minimum thickness of the leaf spring. Preferably, heat is applied to the outside face and across the entire width of the eye over, for ease of explanation, a 180 degree area, for example, at 58 to 60 and/or at 68 to 70 shown in FIG. 1. In another example, heat may be applied to the outer quarter of the eye shown as a 90 degree area, for example, at 56 to 58 and/or at 66 to 68 in FIG. 1. Heat migration from the heated area of the eye preferably should not exceed the location where the parabolic sections 42, 46 of the leaf spring begin, shown as 55 and 65 in FIG. 2.

If a seat 44 undergoes secondary tempering, preferably the heat source should be applied to areas on the top and bottom and across the entire width of the seat and within about a half inch on each side of the center or the center hole (if present) of the seat 44, as shown in FIG. 1 at 48 to 50 and at 48 to 52. Heat migration preferably should not extend beyond the seat.

During secondary tempering, the target surface temperature of the leaf spring at the heated areas within sections undergoing secondary tempering must be increased above the temperature at which primary tempering was conducted.

In one example of this disclosure, secondary tempering occurs immediately after the leaf spring exits the primary tempering furnace without being quenched. The heated areas within the sections undergoing secondary tempering preferably should be heated to a minimum temperature of 1000° F. and a maximum temperature of 1200° F., such as for example 1100° F. for a period of time of 20 seconds or longer. In this example, the temperature of the heated areas within these sections should not exceed 1300° F. Maximum dwell time above about 880° F. is based on the maximum temperature at which retempering occurs. The maximum temperature at the physical limit of the heat affected areas should not exceed 880° F. The temperature of the leaf spring at a location one inch outside of the seat 44 preferably should not exceed 810° F.

After secondary tempering, the leaf spring 40 must be quenched. The temperature of the leaf spring immediately prior to quenching should be at least about 50° F. and preferably at least 75° F. to 100° F. higher than the point at which tempered martensite embrittlement can occur. In this example, temper embrittlement occurs at approximately 500° F., accordingly, the temperature of the leaf spring should be at least about 550° F. and preferably at least 575° F. to 600° F. prior to quenching. After quenching, spring temperature should be less than 150° F., making the spring cool enough to handle by hand. All sections of the spring must be cooled.

In a further example, leaf springs were conventionally tempered at approximately 840° F. for one hour to achieve a through hardness of 470 BHN. These example springs were subjected to secondary tempering by maintaining surface temperature of the heated areas of the eyes at a given temperature for a period of 45 to 60 seconds. The leaf springs in this example were manufactured from Hendrickson 4169 material but could have been made with any suitable material, including but not limited to those materials cited herein. The leaf spring was approximately 4 inches wide and 1⅛ inches thick at the seat and approximately a half inch thick in the eyes. Vickers micro-hardness measurements taken in the eyes, which underwent secondary tempering at 1000° F., 1100° F., and 1200° F., and then quenching, yielded hardness values of respectively, 460 HV, 430 HV and 410 HV, which are equivalent to respectively, 434 BHN, 406 BHN and 388 BHN when converted to Brinell hardness values using standard correlation charts known to those skilled in the art. As a point of comparison, direct surface hardness measurements were taken with a King Brinell hardness tester by placing the anvil on the inside of the eye. The measured hardness values were approximately 20 BHN lower than the Brinell values cited above. The reason for this minor discrepancy is believed to be the result of attempting to directly measure the surface hardness of a curved surface. The round ball indenter of the Brinell hardness tester left oval shaped rather than round impressions which are normally formed when direct surface hardness measurements of a flat surface are taken.

Primary and secondary tempering data for example springs appears in FIG. 3 and the plot of these data appears in FIG. 4. As shown in these Figures, the correlation of finished through hardness (BHN) to the temperature (° F.) at which tempering is conducted is generally linear for both primary or conventional tempering, as well as for secondary tempering. These correlations, however, will differ in slope, as shown in FIG. 4.

When the time for secondary tempering was extended to approximately 15 minutes, finished through hardness fell by approximately 18 BHN from the above-cited values. Accordingly, temperature rather than time was shown to be the dominant influence in hardness during secondary tempering.

As also shown in FIG. 4, when the correlation for finished through hardness to secondary tempering temperature is extrapolated both left and right of the three data points that define this correlation for secondary tempering, one observes that the line for secondary tempering will intersect the line for primary tempering at the approximate temperature and through hardness (840° F., 470 BHN) at which the retempered leaf spring underwent primary tempering. Further, as this correlation for secondary tempering will vary in its vertical position, rather than its slope, for a given primary tempering temperature and hardness, one may extrapolate from this point with the slope of the line for secondary tempering to predict the temperature at which secondary tempering must be performed to achieve a desired through hardness in the sections of the leaf spring so treated.

In yet a further example of the present disclosure, a leaf spring having a two eyes and a seat has a first section that is through hardened and tempered to a finished through hardness of approximately 466 BHN to 510 BHN, and a second section that is through hardened and selectively tempered to a finished through hardness of between 401 BHN and 444 BHN. The first section may comprise one arm, or alternatively, both arms and the seat of the parabolic spring. The second section may respectively comprise one eye or the seat, or alternatively, one eye of the parabolic leaf spring. In this example, the finished through hardness of the second section of the leaf spring may be about 79 to 95 percent of the finished through hardness of the first section of the leaf spring.

In yet a further example, a leaf spring that has undergone processing in accordance with the present disclosure has a first section that is a trailing arm with a finished through hardness of between 375 BHN and 410 BHN, and an eye or seat that has a finished through hardness that is less than the finished through hardness of the first section.

In yet a further example, a leaf spring that has undergone processing in accordance with the present disclosure has a first section that is tempered to a finished through hardness of about 470 BHN, and second and third sections that are selectively tempered to a finished through hardness of respectively, about 434 BHN and 406 BHN.

In yet a further example, a parabolic leaf spring that has undergone processing in accordance with the present disclosure has a first section that includes a seat and first and second parabolic arms, and a second and a third section that includes respectively, a first and second eye positioned at the end of the first and second parabolic arms. The first section is through hardened and tempered to a finished through hardness of 444 BHN to 495 BHN. The second and third sections are through hardened and selectively tempered to a through hardness of 388 BHN to 444 BHN. In this example, the finished through hardness of the second or third sections of the leaf spring may be at least about 70 percent of the finished through hardness of the first section of the leaf spring.

In light of the above discussion, the drawings and the attached claims, it will be appreciated that leaf springs and their manufacture in accordance with the present disclosure may be provided in various configurations. Any variety of suitable materials of construction, configurations, shapes and sizes for leaf springs and their methods of manufacture may be utilized to meet the particular needs and requirements of an end user. It will be apparent to those skilled in the art that various modifications can be made in the design and manufacture of such leaf springs, and in the performance of such methods, without departing from the scope of the attached claims, and that the claims are not limited to the preferred embodiments illustrated.

We claim:

1. A method of selectively tempering to a finished through hardness one or more sections of a leaf spring having at least a first section and a second section spaced apart longitudinally along said leaf spring, each of said first and said second sections extending across an entire transverse cross section of and along said leaf spring, after primary tempering of said leaf spring has commenced, said method comprising the acts of:

applying localized heat to said second section of said leaf spring at a temperature that is above a temperature at which the leaf spring underwent primary tempering and below austenitic transformation temperature, maintaining said localized heat to said second section for a period of 20 seconds or longer, and quenching the leaf spring with an aqueous solution to rapidly cool the second section from a temperature of at least 50° F. above the temperature at which tempered martensite embrittlement can occur to a temperature less than 150° F. and to reduce heat migration into any section to which said localized heat was not applied, resulting in said first section being through hardened and tempered to a finished through hardness and said second section being through hardened and selectively tempered to a finished through hardness that is less than the finished through hardness of said first section.

2. The method of claim 1 wherein the temperature at which tempered martensite embrittlement can occur is 600° F.

3. The method of claim 1 wherein the leaf spring is a parabolic leaf spring wherein said first section thereof includes at least one parabolic arm and has a finished through hardness of between about 466 BHN and 510 BHN, and said second section thereof comprises a first eye or a seat of said leaf spring.

4. The method of claim 1 wherein said localized heat is applied to the second section of the leaf spring to maintain the heated areas of said second section at a temperature between 1000° F. and 1200° F. for a period of time between 45 and 60 seconds.

5. The method of claim 1 wherein the second section of the leaf spring includes at least one eye and said localized heat is applied to said second section across an entire width of a 180 degree zone across the top of said at least one eye.

6. The method of claim 1 wherein the second section of the leaf spring comprises at least one eye and has a finished through hardness of between about 401 BHN and 444 BHN.

7. The method of claim 1 wherein the second section of the leaf spring comprises at least one eye and has a finished through hardness of about 388 BHN or 406 BHN or 434 BHN.

8. The method of claim 1 comprising the additional steps of applying localized heat to a third section of said leaf spring at a temperature above and maintaining localized heat to a third section of the leaf spring, said third section spaced apart longitudinally along said leaf spring from each one of said first section and said second section and extending across an entire transverse cross section of and along said leaf spring, and wherein said second section and said third section respectively comprises a first eye and a second eye, or alternatively, a first eye and a seat of said leaf spring, and said third section is through hardened and tempered to a finished through hardness that is less than the finished through hardness of said first section.

9. The method of claim 1 wherein said localized heat is applied by electric heat induction.

10. The method of claim 1 wherein said second section or said third section is a seat of said leaf spring and said step of applying localized heat to said seat further comprises applying localized heat to zones on top and bottom surfaces and across the seat and within about a half inch on either side of a center of the seat.

11. The method of claim 1 wherein after primary tempering has commenced, the leaf spring is not quenched until after said step applying located heat to said second section.

12. The method of claim 1 comprising a further step of quenching said leaf spring after primary tempering to reduce the leaf spring to ambient temperature before said step of applying localized heat to said second section.

* * * * *